United States Patent
Ando et al.

(10) Patent No.: US 11,572,437 B2
(45) Date of Patent: Feb. 7, 2023

(54) THERMOPLASTIC RESIN, THERMOPLASTIC RESIN COMPOSITION, AND HEAT CONDUCTIVE SHEET

(71) Applicant: KANEKA CORPORATION, Osaka (JP)

(72) Inventors: Takashi Ando, Settsu (JP); Masahiro Miyamoto, Settsu (JP)

(73) Assignee: KANEKA CORPORATION, Osaka (JP)

( * ) Notice: Subject to any disclaimer, the term of this patent is extended or adjusted under 35 U.S.C. 154(b) by 518 days.

(21) Appl. No.: 16/619,242

(22) PCT Filed: Jun. 1, 2018

(86) PCT No.: PCT/JP2018/021205
§ 371 (c)(1),
(2) Date: Dec. 4, 2019

(87) PCT Pub. No.: WO2018/230370
PCT Pub. Date: Dec. 20, 2018

(65) Prior Publication Data
US 2020/0148815 A1 May 14, 2020

(30) Foreign Application Priority Data
Jun. 12, 2017 (JP) .............................. JP2017-115339

(51) Int. Cl.
| | | |
|---|---|---|
| *C08G 63/193* | (2006.01) | |
| *C08K 3/04* | (2006.01) | |
| *C08K 3/013* | (2018.01) | |
| *C08J 5/18* | (2006.01) | |
| *C08K 3/08* | (2006.01) | |
| *C08K 3/22* | (2006.01) | |
| *C08K 3/38* | (2006.01) | |
| *C08K 7/06* | (2006.01) | |
| *C08L 67/02* | (2006.01) | |

(52) U.S. Cl.
CPC .............. *C08G 63/193* (2013.01); *C08J 5/18* (2013.01); *C08K 3/013* (2018.01); *C08K 3/041* (2017.05); *C08K 3/08* (2013.01); *C08K 3/22* (2013.01); *C08K 3/38* (2013.01); *C08K 7/06* (2013.01); *C08L 67/02* (2013.01); *C08K 2003/2227* (2013.01); *C08K 2003/2296* (2013.01); *C08K 2003/385* (2013.01); *C08K 2201/001* (2013.01); *C08L 2201/00* (2013.01); *C08L 2203/30* (2013.01)

(58) Field of Classification Search
None
See application file for complete search history.

(56) References Cited

U.S. PATENT DOCUMENTS

| | | |
|---|---|---|
| 2010/0016498 A1 | 1/2010 | Kaji et al. |
| 2011/0204282 A1 | 8/2011 | Yoshihara et al. |
| 2013/0043425 A1 | 2/2013 | Yoshihara et al. |
| 2016/0304762 A1* | 10/2016 | Yoshihara .............. C08G 63/78 |
| 2017/0204262 A1 | 7/2017 | Yoshihara et al. |

FOREIGN PATENT DOCUMENTS

| | | |
|---|---|---|
| JP | 2008-150525 A | 7/2008 |
| JP | 2010-150377 A | 7/2010 |
| JP | 2011-231161 A | 11/2011 |
| JP | 2015-183033 A | 10/2015 |
| JP | 2016-037540 A | 3/2016 |
| WO | 2006/120993 A1 | 11/2006 |
| WO | 2010/050202 A1 | 5/2010 |
| WO | WO 2011/118845 * | 9/2011 |
| WO | 2011/132389 A1 | 10/2011 |
| WO | 2016/052748 A1 | 4/2016 |

OTHER PUBLICATIONS

Aug. 28, 2018 International Search Report issued in International Patent Application No. PCT/JP2018/021205.

* cited by examiner

*Primary Examiner* — Robert T Butcher
(74) *Attorney, Agent, or Firm* — Oliff PLC

(57) ABSTRACT

A thermoplastic resin (A) including, in its main chain structure, a unit (i) having a biphenyl group, a unit (ii) having a substituent biphenyl group, a unit (iii) having a specific number of atoms in its main chain, and a unit (iv) having a specific number of atoms in its main chain provides a thermoplastic resin which has a low liquid crystal phase transition temperature and a low isotropic phase transition temperature, is highly thermally conductive, and can be processed by molding at a low melting temperature.

16 Claims, No Drawings

THERMOPLASTIC RESIN, THERMOPLASTIC RESIN COMPOSITION, AND HEAT CONDUCTIVE SHEET

TECHNICAL FIELD

The present invention relates to a thermoplastic resin composition which is not only highly thermally conductive but also easy to apply. More specifically, the present invention relates to a thermoplastic resin composition which simultaneously has high thermal conductivity, favorable moldability, and a favorable insulating property due to a synergistic effect which is brought about by using, in combination, (i) a highly thermally conductive matrix resin and (ii) a thermally conductive inorganic filler such as a ceramic material, a metallic material, or a carbon material. Furthermore, the present invention relates to (i) a thermoplastic resin of which the thermoplastic resin composition is to be made and (ii) a thermally conductive sheet containing the thermoplastic resin or the thermoplastic resin composition.

BACKGROUND ART

As an electronic device material for use in a mobile phone, a personal computer, or a hybrid car generates heat in a larger amount, it is immediately necessary to cool the electronic device material by achieving more efficient thermal conduction between members.

As a material for transferring heat between members, plastic is used which is so moldable as to flexibly follow thermal deformation in a member. Note, however, that plastic, which is less thermally conductive than an inorganic matter such as a metallic material, may have a problem of difficulty in releasing generated heat. In order to solve such a problem, an attempt has been widely made to (i) obtain a highly thermally conductive resin composition by mixing a large amount of highly thermally conductive inorganic matter into a thermoplastic resin and (ii) use the highly thermally conductive resin composition thus obtained.

Examples of a highly thermally conductive inorganic matter include graphite, carbon fiber, alumina, and boron nitride. The highly thermally conductive inorganic matter needs to be mixed into a thermoplastic resin in an amount of normally not less than 30% by volume, and further, in an amount as large as not less than 50% by volume.

However, in a case where a large amount of highly thermally conductive inorganic matter, which is graphite or carbon fiber, is mixed into a thermoplastic resin, a highly thermally conductive resin composition deteriorates in electrical insulation and then is made electrically conductive. This causes a problem such that the highly thermally conductive resin composition which is used for an electronic device can only be used in a limited part of the electronic device. Furthermore, mixing of a large amount of ceramic filler such as alumina into a thermoplastic resin causes the following problems: (i) a problem such that the highly thermally conductive resin composition which is used as, for example, a molding material wears a mold because the filler has a high hardness; and (ii) a problem such that a filler contained in a resultant highly thermally conductive resin composition has a high density, so that the resultant highly thermally conductive resin composition deteriorates in processability, and it is difficult to make lighter an electronic device, for example. Moreover, since a thermoplastic resin is less thermally conductive, an improvement in thermal conductivity of a resin composition is limited even in a case where a large amount of inorganic matter is mixed into the thermoplastic resin.

The circumstances require a method for allowing a thermoplastic resin to be more thermally conductive. Concerning a thermoplastic resin, Patent Literature 1 discloses that a resin molded article which is highly thermally conductive in a direction in which liquid crystal polyester is oriented is obtained by orienting the liquid crystal polyester by at least one external field selected from a flow field, a shear field, a magnetic field, and an electric field. Note, however, that the resin molded article is highly thermally conductive in a uniaxial direction but less thermally conductive in other biaxial directions. Note also that a magnetic flux density of at least 3 tesla is necessary for orientation of liquid crystal polyester by, for example, a magnetic field for achievement of a desired thermal conductivity. Thus, it is difficult to produce the resin molded article.

Concerning a thermoplastic resin which is excellent in thermal conductivity of a resin, Patent Literature 2 discloses liquid crystalline polyester, which is an alternating polycondensation product whose main chain structure contains a mesogenic group and a flexible chain. Such liquid crystalline polyester, which has a high order structure having high orderliness, has been known to have a high thermal conductivity. Note, however, that such liquid crystalline polyester, which is highly crystalline, has a high melting point, and is low in flowability of a liquid crystal phase, shows a tendency to have a high processing temperature. This causes a problem such that processing of such liquid crystalline polyester is restricted in the presence of an electronic component which is restricted in exposure to a high temperature.

CITATION LIST

Patent Literatures

[Patent Literature 1]
Japanese Patent Application Publication Tokukai No. 2008-150525
[Patent Literature 2]
International Publication No. WO2006/120993

SUMMARY OF INVENTION

Technical Problem

The present invention has an object to provide (i) a thermoplastic resin and a thermoplastic resin composition each of which is highly thermally conductive and can be processed at a lower temperature and (ii) a thermally conductive sheet containing the thermoplastic resin or the thermoplastic resin composition.

Solution to Problem

The inventors of the present invention carried out diligent study so as to attain the object. As a result, the inventors of the present invention finally found that the following thermoplastic resin (A) is highly flowable even at a low temperature while being highly thermally conductive. Specifically, aspects of the present invention include the following:

[1] A thermoplastic resin (A) including, in its main chain structure, a unit (i) in an amount of 20 mol % to 55 mol %, a unit (ii) in an amount of 5 mol % to 40 mol %, a unit (iii) in an amount of 5 mol % to 40 mol %, and a unit (iv) in an amount of 5 mol % to 40 mol %, with respect to 100 mol %, which is a total molar amount of the unit (i), the unit (ii), the unit (iii), and the unit (iv), the unit (i) having a biphenyl group and being represented by the following general formula (1):

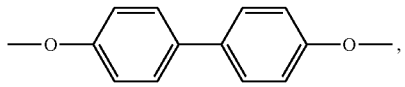
general formula (1)

the unit (ii) having a substituent biphenyl group and being represented by the following general formula (2):

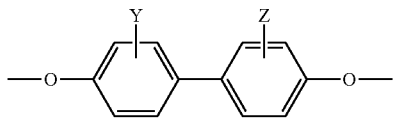
general formula (2)

where Y and Z each represent one or more alkyl substituents, and alkyl groups on a single aromatic ring may be different in kind, the unit (iii) being represented by the following general formula (3):

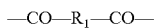
general formula (3)

where $R_1$ represents a divalent linear substituent which has 4 to 12 atoms in its main chain and which may contain a branch, and the unit (iv) being represented by the following general formula (4):

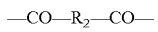
general formula (4)

where $R_2$ is a divalent linear substituent which has, in its main chain, 7 to 26 atoms, different in number of atoms in the main chain of $R_1$, and which may contain a branch, and $R_2$ is larger in number of atoms in the main chain than $R_1$.

[2] A thermoplastic resin composition containing: a thermoplastic resin (A) recited in the above [1]; and an inorganic filler (B).

[3] A thermally conductive sheet containing a thermoplastic resin (A) recited in the above [1] or a thermoplastic resin composition recited in the above [2].

Advantageous Effects of Invention

An aspect of the present invention makes it possible to provide (i) a thermoplastic resin and a thermoplastic resin composition each of which is highly thermally conductive and can be processed at a lower temperature and (ii) a thermally conductive sheet containing the thermoplastic resin or the thermoplastic resin composition.

DESCRIPTION OF EMBODIMENTS

The following description will specifically discuss an embodiment of the present invention. Note, however, that an aspect of the present invention is not limited to the embodiment. The present invention is not limited to arrangements described below, and may be altered in various ways by a skilled person within the scope of the claims. Any embodiment and any example each derived from a proper combination of technical means disclosed in different embodiments and examples are also encompassed in the technical scope of the present invention. Note that any numerical range expressed as "A to B" herein means "not less than A and not more than B".

The term "thermoplasticity" herein means a property of being plasticized by heating.

A thermoplastic resin (A) in accordance with an embodiment of the present invention (hereinafter may be merely referred to as a "resin") includes, in its main chain structure, a unit (i) in an amount of 20 mol % to 55 mol % (preferably 30 mol % to 45 mol % from the viewpoint of thermal conductivity), a unit (ii) in an amount of 5 mol % to 40 mol % (preferably 10 mol % to 20 mol % from the viewpoint of thermal conductivity), a unit (iii) in an amount of 5 mol % to 40 mol % (preferably 10 mol % to 30 mol %), and a unit (iv) in an amount of 5 mol % to 40 mol % (preferably 10 mol % to 30 mol %), with respect to 100 mol %, which is a total molar amount of the unit (i), the unit (ii), the unit (iii), and the unit (iv), the unit (i) having a biphenyl group and being represented by the following general formula (1):

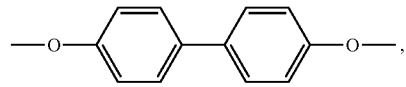
general formula (1)

the unit (ii) having a substituent biphenyl group and being represented by the following general formula (2):

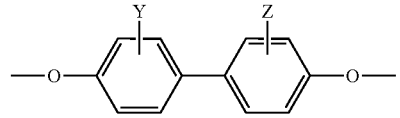
general formula (2)

where Y and Z each represent one or more alkyl substituents, and alkyl groups on a single aromatic ring may be different in kind, the unit (iii) being represented by the following general formula (3):

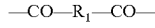
general formula (3)

where $R_1$ represents a divalent linear substituent which has 4 to 12 atoms in its main chain and which may contain a branch, and the unit (iv) being represented by the following general formula (4):

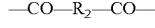
general formula (4)

where $R_2$ is a divalent linear substituent which has, in its main chain, 7 to 26 atoms, different in number of atoms in the main chain of $R_1$, and which may contain a branch, and $R_2$ is larger in number of atoms in the main chain than $R_1$.

A proportion of a total molar amount of the unit (i) and the unit (ii) to a total molar amount of the units (i) to (iv) is preferably 40 mol % to 60 mol %, more preferably 45 mol % to 55 mol %, and most preferably 48 mol % to 52 mol %, with respect to 100 mol %, which is the total molar amount of the units (i) to (iv).

A ratio between a molar amount of the unit (i) and a molar amount of the unit (ii) is preferably 10:1 to 1:2, more preferably 8:1 to 1:2, and most preferably 4:1 to 1:1. In a case where a ratio between a molar amount of the unit (i) and a molar amount of the unit (ii) is higher than 10:1, i.e., in a case where a molar amount of the unit (i) is more than 10 times larger than a molar amount of the unit (ii), the unit (ii) is less effective in reducing a liquid crystal phase transition temperature and an isotropic phase transition temperature. In contrast, in a case where a ratio between a molar amount of the unit (i) and a molar amount of the unit (ii) is lower than 1:2, i.e., in a case where a molar amount of the unit (ii) is more than two times larger than a molar amount of the unit (i), the thermoplastic resin (A) or a thermoplastic resin containing the thermoplastic resin (A) tends to have a lower thermal conductivity.

In the general formula (2) representing the unit (ii), specific examples of Y and/or Z include a methyl group, an ethyl group, an isopropyl group, and an allyl group. Of these groups, a methyl group is particularly preferable because the methyl group brings about a more powerful desired effect.

The unit (ii) has an alkyl group as a substituent in a biphenyl structure so as to have a function as mesogen and/or to reduce a liquid crystal phase transition temperature or an isotropic phase transition temperature. In order to reduce the isotropic phase transition temperature, the unit (ii) is preferably a unit represented by the following general formula (5). In order to reduce the liquid crystal phase transition temperature, the unit (ii) is preferably a unit represented by following general formula (6).

general formula (5)

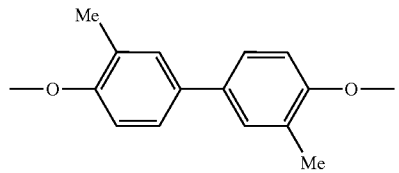

general formula (6)

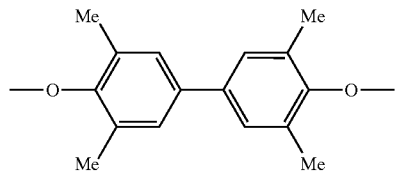

The thermoplastic resin (A) of an embodiment of the present invention may contain both the unit (ii) represented by the general formula (5) and the unit (ii) represented by the general formula (6). In this case, a ratio (A/B) between a molar amount A of the unit (ii) represented by the general formula (5) and a molar amount B of the unit (ii) represented by the general formula (6) is not particularly limited in the thermoplastic resin (A). For example, 0<A/B<100 may be satisfied, 0<A/B<90 may be satisfied, 0<A/B<80 may be satisfied, 0<A/B<70 may be satisfied, 0<A/B<60 may be satisfied, 0<A/B<50 may be satisfied, 0<A/B<40 may be satisfied, 0<A/B<30 may be satisfied, 0<A/B<20 may be satisfied, or 0<A/B<10 may be satisfied.

R in each of the general formula (3) and the general formula (4) which represent the unit (iii) and the unit (iv), respectively, of an aspect of the present invention (specifically, $R_1$ in the general formula (3) and $R_2$ in the general formula (4)) means a flexible molecular chain and functions as a spacer. Examples of R in each of the general formula (3) and the general formula (4) include an aliphatic hydrocarbon chain and a polyether chain.

$R_1$ of the unit (iii) and $R_2$ of the unit (iv) are each desirably a linear aliphatic hydrocarbon chain containing no branch because such a linear aliphatic hydrocarbon chain allows the thermoplastic resin (A) to be more crystalline and have a higher thermal conductivity. Alternatively, $R_1$ and $R_2$ each may be a saturated aliphatic hydrocarbon chain or an unsaturated aliphatic hydrocarbon chain. Note, however, that $R_1$ and $R_2$ are each preferably a saturated aliphatic hydrocarbon chain because the saturated aliphatic hydrocarbon chain allows the thermoplastic resin (A) to be moderately flexible.

Rs which account for more than 50% by weight of a 100% by weight of Rs (i.e., a total of all $R_1$s and all $R_2$s) are each preferably a saturated aliphatic hydrocarbon chain. Most preferably, all the Rs contain no unsaturated bond. A main chain of each of the spacers can be constituted by an atom of any kind that is not particularly limited. Note, however, that the atom is preferably at least one atom selected from the group consisting of C, H, O, S, and N.

A total of the number of atoms in the main chain of $R_1$ and the number of atoms in the main chain of $R_2$ is preferably 11 to 38, more preferably 15 to 30, even more preferably 16 to 25, and particularly preferably 16 to 19. A spacer whose total number of atoms in its main chain falls within the above range is preferable because such a spacer allows the thermoplastic resin (A) to have a sufficiently flexible molecular structure, have a low liquid crystal phase transition temperature, and have a high thermal conductivity. Here, the number of atoms in the main chain is the number of atoms in a skeleton of the main chain. For example, in a case where "—$R_1$—" is "—$(CH_2)_8$—", the number of atoms in the main chain is 8, which is the number of carbon atoms.

In the unit (iii) represented by the general formula (3) "—CO—$R_1$—CO—", $R_1$ represents a divalent linear substituent which has 4 to 12 atoms in its main chain and which may contain a branch. In particular, in order to obtain a resin which has a low liquid crystal phase transition temperature and excellent thermal conductivity, the number of atoms in the main chain of $R_1$ is preferably 5 to 10, more preferably 5 to 8, and particularly preferably 5 to 6.

In the unit (iv) represented by the general formula (4) "—CO—$R_2$—CO—", $R_2$ is a divalent linear substituent which has, in its main chain, 7 to 26 atoms, different in number of atoms in the main chain of $R_1$, and which may contain a branch. In this case, $R_2$ is larger in number of atoms in the main chain than $R_1$. Alternatively, $R_2$ is preferably a linear saturated aliphatic hydrocarbon chain having 7 to 26 carbon atoms, and particularly preferably a linear saturated aliphatic hydrocarbon chain having 7 to 18 carbon atoms. In particular, in order to obtain a resin which has a low liquid crystal phase transition temperature and excellent thermal conductivity, the number of atoms in the main chain of $R_2$ is preferably 10 to 20, more preferably 12 to 15, and particularly preferably 13 to 14.

In order to achieve a lower liquid crystal phase transition temperature and a lower isotropic phase transition temperature, a number obtained by subtracting the number of atoms in the main chain of the unit (iii) from the number of atoms in the main chain of the unit (iv) is preferably not less than 4 and not more than 15, and more preferably not less than 7 and not more than 12.

A proportion of a molar amount of each of the unit (iii) and the unit (iv) to a total molar amount of the units (i) to (iv) is preferably 5 mol % to 40 mol % with respect to 100 mol %, which is the total molar amount of the units (i) to (iv).

A ratio between a molar amount of the unit (iii) and a molar amount of the unit (iv) is preferably 1:8 to 8:1, more preferably 1:6 to 6:1, and most preferably 1:4 to 4:1. The above ratio which falls within 1:8, i.e., the unit (iv) whose molar amount is eight or more times larger than the molar amount of the unit (iii) is preferable because the ratio causes a great shift of a liquid crystal phase transition temperature of a thermoplastic resin to a low-temperature side while maintaining a thermal conductivity of the thermoplastic resin.

An extent of crystallinity of the thermoplastic resin (A) can be determined in accordance with an enthalpy (ΔH) of an endothermic peak in a phase transition from a solid phase to a liquid crystal phase during heating in DSC measurement. A larger ΔH means that the thermoplastic resin (A) is more crystalline.

According to the thermoplastic resin (A) of an aspect of the present invention, the unit (ii) which has a substituent and the units (iii) and (iv) which differ in number of atoms in the main chain are copolymerized. This causes the thermoplastic resin (A) to have a less orderly molecular structure and be less crystalline. However, the thermoplastic resin (A) has a high thermal conductivity. Furthermore, the thermoplastic resin (A) with which a thermally conductive inorganic filler is mixed allows a dramatic increase in thermal conductivity of a thermoplastic resin composition containing the thermoplastic resin (A) and the inorganic filler. This seems to be because (i) the thermoplastic resin (A), whose liquid crystallinity is slightly reduced by copolymerization, can form a micron-order anisotropic domain in which a molecular chain is oriented and (ii) such a domain functions as an excellent thermally conductive path between inorganic fillers.

A terminal of the thermoplastic resin (A) can have any structure that is not particularly limited. Note, however, that a terminal of the thermoplastic resin (A) can be a carboxyl group so that the thermoplastic resin (A) (i) can be more compatible with another resin and (ii) can be a curable resin by using, as a curing agent, a compound having another multifunctional reactive group. In this case, a proportion of the carboxyl group to all terminals of a molecular chain is preferably not less than 60%, more preferably not less than 70%, even more preferably not less than 80%, and most preferably not less than 90%.

In contrast, a terminal of the thermoplastic resin (A) can be sealed with a monofunctional low molecular weight compound (terminal sealing agent) so that the thermoplastic resin (A) can be more resistant to hydrolysis and/or more resistant to heat for a long term. In this case, a proportion of the sealed terminal to all terminals of a molecular chain (a sealing rate, i.e., a terminal sealing rate) is preferably not less than 60%, more preferably not less than 70%, even more preferably not less than 80%, and most preferably not less than 90%.

A terminal sealing rate of the thermoplastic resin (A) can be found by (i) measuring the number of sealed terminal functional groups and the number of unsealed terminal functional groups in the thermoplastic resin (A) and (ii) substituting these numbers into the following numerical expression (1).

Terminal sealing rate (%)=[the number of sealed terminal functional groups]/([the number of sealed terminal functional groups]+[the number of unsealed terminal functional groups])     numerical expression (1)

From the viewpoint of accuracy and simplicity, the number of sealed terminal functional groups and the number of unsealed terminal functional groups are each preferably found by measuring $^1$H-NMR of the thermoplastic resin (A) and based on an integral value of a characteristic signal corresponding to each of the sealed terminal functional groups and each of the unsealed terminal functional groups.

In order to allow the thermoplastic resin (A) to be more thermally conductive, the terminal sealing agent is preferably a monoamine or an aliphatic monocarboxylic acid having 1 to 20 carbon atoms, more preferably an aliphatic monocarboxylic acid having 1 to 20 carbon atoms, and even more preferably an aliphatic monocarboxylic acid having 10 to 20 carbon atoms. Specific examples of the aliphatic monocarboxylic acid include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid, and isobutyric acid; and any mixture of such aliphatic monocarboxylic acids. Of these aliphatic monocarboxylic acids, myristic acid, palmitic acid, or stearic acid is preferable. This is because myristic acid, palmitic acid, or stearic acid particularly allows the thermoplastic resin (A) to be more thermally conductive. Specific examples of the monoamine include aliphatic monoamines such as methylamine, ethylamine, propylamine, butylamine, hexylamine, octylamine, decylamine, stearylamine, dimethylamine, diethylamine, dipropylamine, dibutylamine, and cyclohexylamine; and any mixture of such aliphatic monoamines. Of these aliphatic monoamines, butylamine, hexylamine, octylamine, decylamine, stearylamine, or cyclohexylamine is preferable from the viewpoint of, for example, reactivity, a high boiling point, stability of a sealed terminal, and a price.

The thermoplastic resin (A) in a state of an isotropic mold article has a thermal conductivity of not less than 0.3 W/(m·K), preferably not less than 0.5 W/(m·K), more preferably not less than 0.6 W/(m·K), even more preferably not less than 0.7 W/(m·K), and most preferably not less than 0.8 W/(m·K). An upper limit of the thermal conductivity is not particularly limited. The thermoplastic resin (A) preferably has a higher thermal conductivity. The thermoplastic resin (A) which is not subjected to a physical treatment such as magnetic field formation, voltage application, rubbing, and/or stretching while being molded has a thermal conductivity of generally not more than 30 W/(m·K), and more generally not more than 10 W/(m·K).

The thermal conductivity of the thermoplastic resin (A) herein means a value of a thermal conductivity for which the thermoplastic resin (A) was directly measured with use of a thermal conductivity measuring device. Alternatively, the thermal conductivity of the thermoplastic resin (A) may be a value obtained by (i) directly measuring, with use of a thermal conductivity measuring device, a thermal conductivity of a resin composition containing an isotropic inorganic filler in an amount of 30 vol % to 50 vol % and (ii) calculating a thermal conductivity of a resin matrix based on Bruggeman's theoretical formula, i.e., the following numerical expression (2).

$$1-V=\{(\lambda_c-\lambda_f)/(\lambda_m-\lambda_f)\}\times(\lambda_m/\lambda_c)^{1/3}$$     numerical expression (2)

where V is a volume content of the inorganic filler (0<V<1), $\lambda_c$ is a thermal conductivity of the resin composition, $\lambda_f$ is a thermal conductivity of the inorganic filler, and $\lambda_m$ is a thermal conductivity of the thermoplastic resin (A). Thus, $\lambda_m$ can be calculated in a case where V, $\lambda_c$, and $\lambda_f$ are made clear.

The thermoplastic resin (A) can be copolymerized with another monomer provided that the thermoplastic resin (A) does not lose its effect. Examples of the another monomer include aromatic hydroxycarboxylic acids, aromatic dicarboxylic acids, aromatic diols excluding an aromatic diol represented by the general formula (2), aromatic hydroxyamines, aromatic diamines, aromatic aminocarboxylic acids, caprolactams, caprolactones, aliphatic dicarboxylic acids, aliphatic diols, aliphatic diamines, alicyclic dicarboxylic acids, alicyclic diols, aromatic mercaptocarboxylic acids, aromatic dithiols, and aromatic mercaptophenols.

Furthermore, an aspect of the present invention relates to a thermoplastic resin composition containing the thermoplastic resin (A) and an inorganic filler (B).

The inorganic filler (B) can be a common inorganic filler. The inorganic filler (B) preferably has a thermal conductivity of not less than 5 W/m·K.

From the viewpoint of an insulating property and a thermal expansion coefficient, the inorganic filler (B) is preferably at least one inorganic filler selected from the group consisting of magnesium oxide, magnesium hydroxide, aluminum oxide (alumina), aluminum hydroxide, aluminum nitride, boron nitride, silicon nitride, a diamond filler, zinc oxide, silicon carbide, and silicon oxide.

Such inorganic fillers (B) are more preferably used in combination than used alone. In particular, an inorganic filler (B) is preferably a mixture of alumina and boron nitride.

From the viewpoint of a thermal conductivity, an insulating property, and a thermal expansion coefficient, the inorganic filler (B) is preferably at least one inorganic filler selected from the group consisting of magnesium oxide, aluminum oxide, aluminum nitride, boron nitride, a diamond filler, zinc oxide, and silicon carbide. Note that zinc oxide and silicon carbide may be insulated as appropriate. The following is a result of measurement of respective thermal conductivities of materials. Specifically, magnesium oxide has a thermal conductivity of, for example, 37 W/m·K, aluminum oxide has a thermal conductivity of, for example, 30 W/m·K, aluminum nitride has a thermal conductivity of, for example, 200 W/m·K, boron nitride has a thermal conductivity of, for example, 30 W/m·K, diamond has a thermal conductivity of, for example, 2000 W/m·K, zinc oxide has a thermal conductivity of, for example, 54 W/m·K, and silicon carbide has a thermal conductivity of, for example, 90 W/m·K. Note that silicon oxide has a thermal conductivity of, for example, 1.4 W/m·K as a result of measurement of a thermal conductivity thereof.

From the viewpoint of a thermal conductivity and a thermal expansion coefficient, the inorganic filler (B) is preferably at least one inorganic filler selected from the group consisting of graphite, a carbon nanotube, carbon fiber, electrically conductive metal powder, electrically conductive metal fiber, and soft magnetic ferrite. Such inorganic filler(s) (B) may be used alone or in combination.

The inorganic filler(s) (B) which has/have an average particle size (in a case where the inorganic filler(s) (B) is/are not granular, an average maximum diameter thereof) that is not particularly limited but is not more than 100 μm is preferable so that the inorganic filler(s) (B) is/are uniformly dispersed in a thermoplastic resin composition. The inorganic filler(s) (B) which has/have an average particle size of more than 100 μm may make it difficult for components to be uniformly dispersed in a sheet which is made of a thermoplastic resin composition. Note here that the average particle size of the inorganic filler(s) (B) is measured with use of a dynamic light scattering Nanotrac particle size analyzer. The inorganic filler(s) (B) may be used alone or in combination of two or more kinds.

From the viewpoint of thermal conductivity and flowability, the thermoplastic resin composition contains the thermoplastic resin (A) and the inorganic filler(s) (B) at a volume ratio of preferably 95:5 to 20:80, more preferably 90:10 to 20:80, and even more preferably 80:20 to 20:80. The thermoplastic resin composition which contains the thermoplastic resin (A) and the inorganic filler(s) (B) at a volume ratio of 100:0 to 95:5 may be unable to obtain a satisfactory thermal conductivity. In contrast, the thermoplastic resin composition which contains the thermoplastic resin (A) and the inorganic filler(s) (B) at a volume ratio of 20:80 to 0:100 easily deteriorates in processability.

An aspect of the present invention relates to a thermally conductive sheet containing the thermoplastic resin (A) or a thermoplastic resin composition. Note that a method by which to produce the thermally conductive sheet is not particularly limited but may be a well-known method (e.g., extrusion molding, injection molding, or casting with use of a solvent).

The thermoplastic resin composition may be applied with use of an organic solvent so as to be more easily applied. Examples of the organic solvent include aromatic solvents (e.g., toluene and xylene) and ketone solvents (e.g., methylethylketone, cyclohexanone, and methyl isobutyl ketone). Examples of the organic solvent also include halogen solvents such as trichloroethane, dichloromethane, and chloroform. Other examples of the organic solvent include N-methyl-4-pyrrolidone, tetrahydrofuran, and 1,4-dioxane. The above organic solvents may be used alone or in combination of two or more kinds. An amount of the organic solvent(s) used is not particularly limited. Note, however, that the organic solvent(s) is/are preferably used so that a solid content is contained in an amount of 20% by mass to 50% by mass.

A device for, for example, dissolving or dispersing these raw materials is exemplified by, but not particularly limited to, a stirring device; and a mortar machine, a triple roll mill, a ball mill, a planetary mixer, and a beads mill each including a heating device. These devices may be used in combination as appropriate.

An embodiment of the present invention can be arranged as below.

[1] A thermoplastic resin (A) including, in its main chain structure, a unit (i) in an amount of 20 mol % to 55 mol %, a unit (ii) in an amount of 5 mol % to 40 mol %, a unit (iii) in an amount of 5 mol % to 40 mol %, and a unit (iv) in an amount of 5 mol % to 40 mol %, with respect to 100 mol %, which is a total molar amount of the unit (i), the unit (ii), the unit (iii), and the unit (iv), the unit (i) having a biphenyl group and being represented by the following general formula (1):

general formula (1)

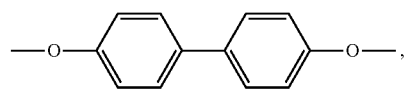

the unit (ii) having a substituent biphenyl group and being represented by the following general formula (2):

general formula (2)

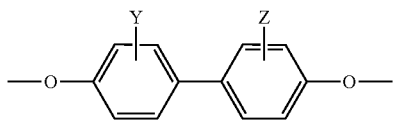

where Y and Z each represent one or more alkyl substituents, and alkyl groups on a single aromatic ring may be different in kind, the unit (iii) being represented by the following general formula (3):

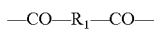  general formula (3)

where $R_1$ represents a divalent linear substituent which has 4 to 12 atoms in its main chain and which may contain a branch, and the unit (iv) being represented by the following general formula (4):

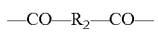  general formula (4)

where $R_2$ is a divalent linear substituent which has, in its main chain, 7 to 26 atoms, different in number of atoms in the main chain of $R_1$, and which may contain a branch, and $R_2$ is larger in number of atoms in the main chain than $R_1$.

[2] The thermoplastic resin (A) recited in [1], wherein the unit (ii) included in the thermoplastic resin (A) and having a substituent biphenyl group is represented by the following general formula (5):

general formula (5)

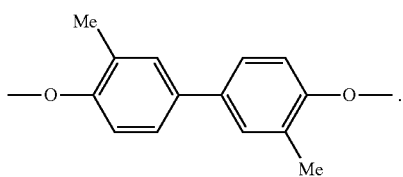

[3] The thermoplastic resin (A) recited in [1], wherein the unit (ii) included in the thermoplastic resin (A) and having a substituent biphenyl group is represented by the following general formula (6):

general formula (6)

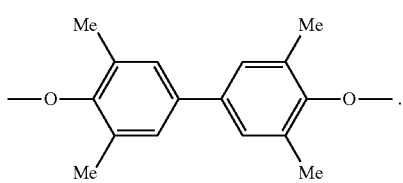

[4] The thermoplastic resin (A) recited in any one of [1] through [3], wherein a number obtained by subtracting the number of atoms in the main chain of the unit (iii) from the number of atoms in the main chain of the unit (iv) is not less than 4 and not more than 15.

[5] A thermoplastic resin composition containing: a thermoplastic resin (A) recited in any one of [1] through [4]; and an inorganic filler (B).

[6] The thermoplastic resin composition recited in [5], wherein the inorganic filler (B) is at least one compound selected from the group consisting of aluminum oxide, magnesium oxide, boron nitride, aluminum nitride, silicon nitride, aluminum hydroxide, magnesium hydroxide, and diamond.

[7] The thermoplastic resin composition recited in [5], wherein the inorganic filler (B) is a mixture of alumina and boron nitride.

[8] The thermoplastic resin composition recited in [5], wherein the inorganic filler (B) is at least one compound selected from the group consisting of graphite, a carbon nanotube, carbon fiber, electrically conductive metal powder, electrically conductive metal fiber, soft magnetic ferrite, and zinc oxide.

[9] A thermally conductive sheet containing a thermoplastic resin (A) recited in any one of [1] through [4] or a thermoplastic resin composition recited in any one of [5] through [8].

EXAMPLES

The following description will more specifically discuss a resin composition of an aspect of the present invention with reference to Production Examples, Examples, and Comparative Examples. Note, however, that an aspect of the present invention is not limited to such Examples. Note that reagents manufactured by Wako Pure Chemical Industries, Ltd. were used below without being purified, unless otherwise specified.

<(A) Thermoplastic Resin>

(A1) a thermoplastic resin produced by a method described in Production Example 1;

(A2) a thermoplastic resin produced by a method described in Production Example 2;

(A3) a thermoplastic resin produced by a method described in Production Example 3;

(A4) a thermoplastic resin produced by a method described in Production Example 4;

(A5) a thermoplastic resin produced by a method described in Production Example 5; and (A6) a thermoplastic resin produced by a method described in Production Example 6

<(B) Inorganic Filler>

(B1) alumina (AS-50, manufactured by Showa Denko K.K., having an average particle size ($d_{50}$) of 9 μm and a BET specific surface area of 1.9 $m^2/g$);

(B2) alumina (AL-47-H, manufactured by Showa Denko K.K., having an average particle size ($d_{50}$) of 2.1 μm and a BET specific surface area of 1.8 $m^2/g$;

(B3) alumina (AS-400, manufactured by Showa Denko K.K., having an average particle size ($d_{50}$) of 13 μm and a BET specific surface area of 1.2 $m^2/g$);

(B4) boron nitride (PTX-60s, manufactured by Momentive Performance Materials, having an average particle size ($d_{50}$) of 60 μm; and (B5) boron nitride (FP-70, manufactured by Denka Co., Ltd., having an average particle size ($d_{50}$) of 70 μm

[Evaluation Method]

<Number Average Molecular Weight>

A sample solution was prepared by dissolving a thermoplastic resin in a mixed solvent, containing p-chlorophenol (manufactured by Tokyo Chemical Industry Co., Ltd.) and toluene at a volume ratio of 3:8, so that the thermoplastic resin had a concentration of 0.25% by weight. Polystyrene was used as a standard substance, and a similar operation was carried out, so that a standard solution was prepared. Then, such a solution was used to measure a number average molecular weight of the thermoplastic resin at a column temperature of 80° C. and a flow rate of 1.00 mL/min with use of a high temperature GPC (350 HT-GPC System, manufactured by Viscotek Co.). A differential refractometer (RI) was used as a detector.

<Phase Transition Temperature>

By differential scanning calorimetry (DSC measurement), a point ($T_s$) of transition from a solid phase to a liquid crystal phase and a point ($T_i$) of transition from a liquid crystal phase to an isotropic phase were obtained from a peak top of an endothermic peak obtained in a case where heating and cooling were carried out at a rate of 20° C./min in a range of 50° C. to 250° C. and then heating was carried out at a rate of 20° C./min. In a case where three or more phase transition temperatures were observed, a phase transition temperature nearest to an isotropic phase transition temperature was regarded as a liquid crystal phase transition temperature.

<Specific Gravity (Density)>

A resin composition having been heat-cured was formed into pieces, having a weight equal to 0.2 g to 0.6 g, so that a specific gravity thereof was measured by an Archimedean method.

<Thermal Conductivity>

A thermoplastic resin composition containing fine powder of a thermoplastic resin and an inorganic filler was heat-pressed at a liquid crystal phase transition temperature and adjusted so as to have a thickness in a range of 200 μm to 500 μm. Next, the thermoplastic resin composition was heated at a temperature equal to or higher than an isotropic phase transition temperature and then cooled, so that a molded article in which resin orientation had been lost was obtained.

A thermal diffusivity in a thickness direction of each molded article was measured at a room temperature (25° C.) with use of a laser flash method thermal conductivity measuring device (LFA447, manufactured by Netzsch Inc.). A thermal diffusivity was converted into a thermal conductivity with use of (i) a composition ratio between the thermoplastic resin and the inorganic filler of the each molded article, (ii) a density measured by the Archimedean method, and (iii) specific heat per weight calculated by DSC. A thermal conductivity in a surface direction of the each molded article was measured with use of Thermowave Analyzer (TA3, manufactured by BETHEL Co., Ltd.). After a thermal conductivity of a thermoplastic resin composition with which alumina (AS-50, manufactured by Showa Denko K.K.) having a thermal conductivity of 25 W/(m·K) was mixed in a proportion of 50 v % was measured, a thermal conductivity of the thermoplastic resin was calculated based on Bruggeman's theoretical formula with use of (i) the thermal conductivity of the thermoplastic resin composition and (ii) the thermal conductivity of the alumina.

Production Example 1

Into a three-necked flask provided with a stirring bar, 4,4'-dihydroxybiphenyl (a compound having the unit (i)) in an amount of 39 mol %, a compound represented by a general formula (7) (a compound having the unit (ii) in an amount of 13 mol %, azelaic acid (a compound having the unit (iii)) in an amount of 24 mol %, and tridecanedioic acid (a compound having the unit (iv)) in an amount of 24 mol % were fed as raw materials. Furthermore, 2.1 equivalents of acetic anhydride was added to the unit (i) and the unit (ii), and a catalytic amount of sodium acetate was added to the unit (i) and the unit (ii). Then, gas in the Erlenmeyer flask was replaced with nitrogen.

A resultant mixture was reacted at an ordinary pressure, under a nitrogen atmosphere, and at a temperature of 145° C., so that a homogeneous solution was obtained. Thereafter, the solution was heated to 260° C. at a rate of 2° C./min while acetic acid was being distilled off, and the solution was stirred at 260° C. for 1 hour so as to be subjected to copolymerization. While the solution was being continuously heated to 270° C., pressure was reduced in the Erlenmeyer flask with use of a diaphragm pump. Then, the solution was subjected to copolymerization over approximately 90 minutes while a state of reduced pressure was maintained. Thereafter, the pressure inside the Erlenmeyer flask was reset to the ordinary pressure with use of nitrogen gas, so that a resultant thermoplastic resin (A1) was taken out.

The thermoplastic resin (A1) was heated, in cyclohexane, to 150° C. at a concentration of 10 wt % and then cooled so as to be recrystallized. After the cyclohexane solution was filtrated, a resultant resin was washed with methanol and dried at 70° C. for 16 hours, so that fine powder of the thermoplastic resin (A1) was obtained. The thermoplastic resin (A1) had a number average molecular weight of 14100.

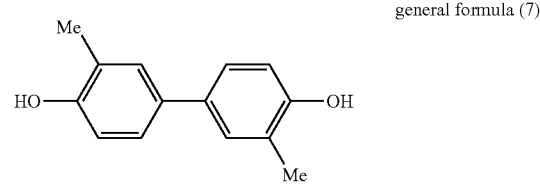 [SMILES: Cc1cc(-c2ccc(O)c(C)c2)ccc1O]

general formula (7)

Production Example 2

Into a three-necked flask provided with a stirring bar, 4,4'-dihydroxybiphenyl (a compound having the unit (i)) in an amount of 39 mol %, a compound represented by the general formula (7) (a compound having the unit (ii)) in an amount of 13 mol %, pimelic acid (a compound having the unit (iii)) in an amount of 24 mol %, and tridecanedioic acid (a compound having the unit (iv)) in an amount of 24 mol % were fed as raw materials. Furthermore, 2.1 equivalents of acetic anhydride was added to the unit (i) and the unit (ii), and a catalytic amount of sodium acetate was added to the unit (i) and the unit (ii). Then, gas in the Erlenmeyer flask was replaced with nitrogen.

A resultant mixture was reacted at an ordinary pressure, under a nitrogen atmosphere, and at a temperature of 145° C., so that a homogeneous solution was obtained. Thereafter, the solution was heated to 260° C. at a rate of 2° C./min while acetic acid was being distilled off, and the solution was stirred at 260° C. for 1 hour so as to be subjected to copolymerization. While the solution was being continuously heated to 270° C., pressure was reduced in the Erlenmeyer flask with use of a diaphragm pump. Then, the solution was subjected to copolymerization over approximately 90 minutes while a state of reduced pressure was maintained. Thereafter, the pressure inside the Erlenmeyer flask was reset to the ordinary pressure with use of nitrogen gas, so that a resultant thermoplastic resin (A2) was taken out.

The thermoplastic resin (A2) was heated, in cyclohexane, to 150° C. at a concentration of 10 wt % and then cooled so as to be recrystallized. After the cyclohexane solution was filtrated, a resultant resin was washed with methanol and dried at 70° C. for 16 hours, so that fine powder of the thermoplastic resin (A2) was obtained. The thermoplastic resin (A2) had a number average molecular weight of 6900.

Production Example 3

Into a three-necked flask provided with a stirring bar, 4,4'-dihydroxybiphenyl (a compound having the unit (i)) in an amount of 36 mol %, a compound represented by a general formula (8) (a compound having the unit (ii)) in an amount of 16 mol %, pimelic acid (a compound having the unit (iii)) in an amount of 24 mol %, and tridecanedioic acid (a compound having the unit (iv)) in an amount of 24 mol % were fed as raw materials. Furthermore, 2.1 equivalents of acetic anhydride was added to the unit (i) and the unit (ii), and a catalytic amount of sodium acetate was added to the unit (i) and the unit (ii). Then, gas in the Erlenmeyer flask was replaced with nitrogen.

A resultant mixture was reacted at an ordinary pressure, under a nitrogen atmosphere, and at a temperature of 145° C., so that a homogeneous solution was obtained. Thereafter, the solution was heated to 260° C. at a rate of 2° C./min while acetic acid was being distilled off, and the solution was stirred at 260° C. for 1 hour so as to be subjected to copolymerization. While the solution was being continuously heated to 270° C., pressure was reduced in the Erlenmeyer flask with use of a diaphragm pump. Then, the solution was subjected to copolymerization over approximately 90 minutes while a state of reduced pressure was maintained. Thereafter, the pressure inside the Erlenmeyer flask was reset to the ordinary pressure with use of nitrogen gas, so that a resultant thermoplastic resin (A3) was taken out.

The thermoplastic resin (A3) was heated, in cyclohexane, to 150° C. at a concentration of 10 wt % and then cooled so as to be recrystallized. After the cyclohexane solution was filtrated, a resultant resin was washed with methanol and dried at 70° C. for 16 hours, so that fine powder of the thermoplastic resin (A3) was obtained. The thermoplastic resin (A3) had a number average molecular weight of 5970.

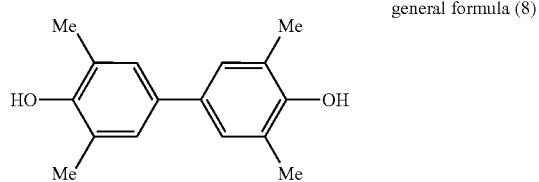 [SMILES: Cc1cc(-c2cc(C)c(O)c(C)c2)cc(C)c1O]

general formula (8)

Production Example 4

Into a three-necked flask provided with a stirring bar, 4,4'-dihydroxybiphenyl (a compound having the unit (i)) in an amount of 25 mol %, a compound represented by the general formula (7) (a compound having the unit (ii)) in an amount of 25 mol %, sebacic acid (a compound having the unit (iii)) in an amount of 25 mol %, and tetradecanedioic acid (a compound having the unit (iv)) in an amount of 25 mol % were fed as raw materials. Furthermore, 2.1 equivalents of acetic anhydride was added to the unit (i) and the unit (ii), and a catalytic amount of sodium acetate was added to the unit (i) and the unit (ii). Then, gas in the Erlenmeyer flask was replaced with nitrogen.

A resultant mixture was reacted at an ordinary pressure, under a nitrogen atmosphere, and at a temperature of 145° C., so that a homogeneous solution was obtained. Thereafter, the solution was heated to 260° C. at a rate of 2° C./min while acetic acid was being distilled off, and the solution was stirred at 260° C. for 1 hour so as to be subjected to copolymerization. While the solution was being continuously heated to 270° C., pressure was reduced in the Erlenmeyer flask with use of a diaphragm pump. Then, the solution was subjected to copolymerization over approximately 90 minutes while a state of reduced pressure was maintained. Thereafter, the pressure inside the Erlenmeyer flask was reset to the ordinary pressure with use of nitrogen gas, so that a resultant thermoplastic resin (A4) was taken out.

The thermoplastic resin (A4) was heated, in cyclohexane, to 150° C. at a concentration of 10 wt % and then cooled so as to be recrystallized. After the cyclohexane solution was filtrated, a resultant resin was washed with methanol and dried at 70° C. for 16 hours, so that fine powder of the thermoplastic resin (A4) was obtained. The thermoplastic resin (A4) had a number average molecular weight of 9500.

Production Example 5

Into a three-necked flask provided with a stirring bar, 4,4'-dihydroxybiphenyl (a compound having the unit (i)) in an amount of 52 mol %, azelaic acid (a compound having the unit (iii)) in an amount of 24 mol %, and tridecanedioic acid (a compound having the unit (iv)) in an amount of 24 mol % were fed as raw materials. Furthermore, 2.1 equivalents of acetic anhydride was added to the compound represented by the unit (i), and a catalytic amount of sodium acetate was added to the compound represented by the unit (i). Then, gas in the Erlenmeyer flask was replaced with nitrogen.

A resultant mixture was reacted at an ordinary pressure, under a nitrogen atmosphere, and at a temperature of 145° C., so that a homogeneous solution was obtained. Thereafter, the solution was heated to 260° C. at a rate of 2° C./min while acetic acid was being distilled off, and the solution was stirred at 260° C. for 1 hour so as to be subjected to copolymerization. While the solution was being continuously heated to 270° C., pressure was reduced in the Erlenmeyer flask with use of a diaphragm pump. Then, the solution was subjected to copolymerization over approximately 90 minutes while a state of reduced pressure was maintained. Thereafter, the pressure inside the Erlenmeyer flask was reset to the ordinary pressure with use of nitrogen gas, so that a resultant thermoplastic resin (A5) was taken out.

The thermoplastic resin (A5) was heated, in cyclohexane, to 150° C. at a concentration of 10 wt % and then cooled so as to be recrystallized. After the cyclohexane solution was filtrated, a resultant resin was washed with methanol and dried at 70° C. for 16 hours, so that fine powder of the thermoplastic resin (A5) was obtained. The thermoplastic resin (A5) had a number average molecular weight of 11800.

Production Example 6

Into a three-necked flask provided with a stirring bar, 4,4'-dihydroxybiphenyl (a compound having the unit (i)) in an amount of 39 mol %, a compound represented by the general formula (7) (a compound having the unit (ii)) in an amount of 13 mol %, and azelaic acid (a compound having the unit (iii)) in an amount of 48 mol % were fed as raw materials. Furthermore, 2.1 equivalents of acetic anhydride was added to the unit (i) and the unit (ii), and a catalytic amount of sodium acetate was added to the unit (i) and the unit (ii). Then, gas in the Erlenmeyer flask was replaced with nitrogen.

A resultant mixture was reacted at an ordinary pressure, under a nitrogen atmosphere, and at a temperature of 145° C., so that a homogeneous solution was obtained. Thereafter, the solution was heated to 260° C. at a rate of 2° C./min while acetic acid was being distilled off, and the solution was stirred at 260° C. for 1 hour so as to be subjected to copolymerization. While the solution was being continuously heated to 270° C., pressure was reduced in the Erlenmeyer flask with use of a diaphragm pump. Then, the solution was subjected to copolymerization over approximately 90 minutes while a state of reduced pressure was maintained. Thereafter, the pressure inside the Erlenmeyer flask was reset to the ordinary pressure with use of nitrogen gas, so that a resultant thermoplastic resin (A6) was taken out.

The thermoplastic resin (A6) was heated, in cyclohexane, to 150° C. at a concentration of 10 wt % and then cooled so as to be recrystallized. After the cyclohexane solution was filtrated, a resultant resin was washed with methanol and dried at 70° C. for 16 hours, so that fine powder of the thermoplastic resin (A6) was obtained. The thermoplastic resin (A6) had a number average molecular weight of 9000.

Examples 1-1 to 1-4, Comparative Examples 1-1 and 1-2

Measured were a density, a liquid crystal phase transition temperature, an isotropic phase transition temperature, and a thermal conductivity (in a thickness direction) of a corresponding one of the thermoplastic resins (A1) to (A6) obtained in respective Production Examples 1 to 6.

Examples 2-1 to 2-4, Comparative Examples 2-1 and 2-2

A mixture was prepared by mixing the fine powder of a corresponding one of the thermoplastic resins (A1) to (A6), obtained in respective Production Examples 1 to 6, in an amount of 50% by volume and the (B1) alumina (AS-50, manufactured by Showa Denko K.K.) in an amount of 50% by volume. The mixture was heated to a temperature equal to or higher than an isotropic phase transition temperature and then cooled. Thereafter, the mixture was heat-pressed at a liquid crystal phase transition temperature, so that a thermoplastic resin composition molded article having a thickness of 100 µm to 350 µm was obtained. In Comparative Example 2-2, a disc-like thermoplastic resin composition molded article of 1 mm×25.4 mmφ was prepared with use of an injection molding machine. A thermal conductivity of a resultant thermoplastic resin composition molded article was measured.

Examples 2-5 to 2-7

A thermoplastic resin composition molded article was obtained by heat-pressing, at a liquid crystal phase transition temperature, a thermoplastic resin composition containing fine powder of a (A) thermoplastic resin and a (B) inorganic filler, preparing a sheet having a thickness in a range of 200 µm to 500 µm, and thereafter heating the sheet at a temperature equal to or higher than an isotropic phase transition temperature and then cooling the sheet. A corresponding one of the (B2) alumina (AL-47-H, manufactured by Showa Denko K.K.), the (B3) alumina (AS-400, manufactured by Showa Denko K.K.), the (B4) boron nitride (FP-70, manufactured by Denka Co., Ltd.), and the (B5) boron nitride (PTX-60s, manufactured by Momentive Performance Materials) was used as the (B) inorganic filler to mix the fine powder of the (A) thermoplastic resin and the (B) inorganic filler at a ratio shown in Table 2. A thermal conductivity of a resultant thermoplastic resin composition molded article was measured.

TABLE 1

| | | | | | Example 1-1 | Example 1-2 | Example 1-3 | Example 1-4 |
|---|---|---|---|---|---|---|---|---|
| Composition of (A) | | | | | A1 Production Example 1 | A2 Production Example 2 | A3 Production Example 3 | A4 Production Example 4 |
| | (i) | Biphenyl | 4,4'-dihydroxybiphenyl | mol % | 39 | 39 | 36 | 25 |
| | (ii) | Substituent biphenyl | Compound represented by general formula (7) | | 13 | 13 | | 25 |
| | | | Compound represented by general formula (8) | | | | 16 | |
| | (iii) | Pimelic acid | (Number of atoms in main chain: 5) | | | | 24 | 24 |
| | | Azelaic acid | (Number of atoms in main chain: 7) | | | 24 | | |
| | | Sebacic acid | (Number of atoms in main chain: 10) | | | | | 25 |
| | (iv) | Tridecanedioic acid | (Number of atoms in main chain: 13) | | 24 | 24 | 24 | |
| | | Tetradecanedioic acid | (Number of atoms in main chain: 14) | | | | | 25 |
| | | | Number obtained by subtracting number of atoms in main chain of unit (iii) from number of atoms in main chain of unit (iv) | | 6 | 8 | 8 | 4 |

TABLE 1-continued

| | | | | | | | |
|---|---|---|---|---|---|---|---|
| Physical properties of (A) | Number average molecular weight | g/mol | 14100 | 6900 | 5970 | 9500 | |
| | Density | g/cm³ | 1.18 | 1.17 | 1.17 | 1.16 | |
| | Liquid crystal phase transition temperature | °C. | 161 | 130 | 106 | 110 | |
| | Isotropic phase transition temperature | °C. | 186 | 161 | 171 | 175 | |
| | Thermal conductivity (thickness direction) | W/(m·K) | 0.8 | 0.8 | 0.9 | 0.6 | |

| | | | | | Comparative Example 1-1 | Comparative Example 1-2 |
|---|---|---|---|---|---|---|
| Composition of (A) | | | | | A5 Production Example 5 | A6 Production Example 6 |
| (i) | Biphenyl | 4,4'-dihydroxybiphenyl | | mol % | 52 | 39 |
| (ii) | Substituent biphenyl | Compound represented by general formula (7) | | | | 13 |
| | | Compound represented by general formula (8) | | | | |
| (iii) | Pimelic acid | (Number of atoms in main chain: 5) | | | | |
| | Azelaic acid | (Number of atoms in main chain: 7) | | | 24 | 48 |
| | Sebacic acid | (Number of atoms in main chain: 10) | | | | |
| (iv) | Tridecanedioic acid | (Number of atoms in main chain: 13) | | | 24 | |
| | Tetradecanedioic acid | (Number of atoms in main chain: 14) | | | | |
| | Number obtained by subtracting number of atoms in main chain of unit (iii) from number of atoms in main chain of unit (iv) | | | | 6 | — |
| Physical properties of (A) | Number average molecular weight | | | g/mol | 11800 | 9000 |
| | Density | | | g/cm³ | 1.20 | 1.20 |
| | Liquid crystal phase transition temperature | | | °C. | 200 | 187 |
| | Isotropic phase transition temperature | | | °C. | 217 | 207 |
| | Thermal conductivity (thickness direction) | | | W/(m·K) | 0.7 | 0.3 |

TABLE 2

| | | | | | | Example 2-1 | Example 2-2 | Example 2-3 | Example 2-4 | Example 2-5 | Example 2-6 | Example 2-7 |
|---|---|---|---|---|---|---|---|---|---|---|---|---|
| Composition | Thermoplastic resin | A1 | | See Production Example 1 | vol % | 50 | | | | | | |
| | | A2 | | See Production Example 2 | vol % | | 50 | | | 40 | 40 | 40 |
| | | A3 | | See Production Example 3 | vol % | | | 50 | | | | |
| | | A4 | | See Production Example 4 | vol % | | | | 50 | | | |
| | | A5 | | See Production Example 5 | vol % | | | | | | | |
| | | A6 | | See Production Example 6 | vol % | | | | | | | |
| | Inorganic filler | B1 | Alumina | AS-50 | vol % | 50 | 50 | 50 | 50 | | | |
| | | B2 | Alumina | AL-47-H | vol % | | | | | 60 | | |
| | | B3 | Alumina | AS-400 | vol % | | | | | | 30 | 30 |
| | | B4 | Boron nitride | PTX-60S | vol % | | | | | | 30 | |
| | | B5 | Boron nitride | FP-70 | vol % | | | | | | | 30 |
| Evaluation | Thermal conductivity | Thickness direction | | | W/(m·K) | 4.08 | 4.09 | 4.44 | 3.30 | 6.75 | 7.93 | 3.08 |
| | | Surface direction | | | W/(m·K) | — | — | — | — | — | 10.3 | 9.87 |

| | | | | | | Comparative Example 2-1 | Comparative Example 2-2 |
|---|---|---|---|---|---|---|---|
| Composition | Thermoplastic resin | A1 | | See Production Example 1 | vol % | | |
| | | A2 | | See Production Example 2 | vol % | | |
| | | A3 | | See Production Example 3 | vol % | | |

TABLE 2-continued

|  |  |  |  |  |  |  |  |
|---|---|---|---|---|---|---|---|
|  |  | A4 |  | See Production Example 4 | vol % |  |  |
|  |  | A5 |  | See Production Example 5 | vol % | 50 |  |
|  |  | A6 |  | See Production Example 6 | vol % |  | 50 |
|  | Inorganic filler | B1 | Alumina | AS-50 | vol % | 50 | 50 |
|  |  | B2 | Alumina | AL-47-H | vol % |  |  |
|  |  | B3 | Alumina | AS-400 | vol % |  |  |
|  |  | B4 | Boron nitride | PTX-60S | vol % |  |  |
|  |  | B5 | Boron nitride | FP-70 | vol % |  |  |
| Evaluation | Thermal conductivity | Thickness direction |  |  | W/(m·K) | 3.88 | 1.83 |
|  |  | Surface direction |  |  | W/(m·K) | — | 1.80 |

As shown in Table 1, a comparison between (a) the thermoplastic resin (A5) of Comparative Example 1-1, the thermoplastic resin (A5) having the unit (i) and having no unit (ii), and (b) the thermoplastic resin (A1) of Example 1-1, the thermoplastic resin (A1) having both the unit (i) and the unit (ii), reveals that the thermoplastic resin (A1) of Example 1-1 had a lower liquid crystal phase transition temperature and a lower isotropic phase transition temperature than the thermoplastic resin (A5) of Comparative Example 1-1 while being nearly equal in thermal conductivity to the thermoplastic resin (A5) of Comparative Example 1-1.

Furthermore, a comparison between (a) the thermoplastic resin (A6) of Comparative Example 1-2, the thermoplastic resin (A6) having the units (i), (ii), and (iii), and (b) the thermoplastic resin (A1) of Example 1-1, the thermoplastic resin (A1) having the units (i), (ii), (iii) and (iv), reveals that the thermoplastic resin (A1) of Example 1-1 had a lower liquid crystal phase transition temperature and a lower isotropic phase transition temperature than the thermoplastic resin (A6) of Comparative Example 1-2 while having a higher thermal conductivity than the thermoplastic resin (A6) of Comparative Example 1-2.

Table 2 shows that a molded article of each of Examples 2-1 to 2-7, in which molded article the thermoplastic resin (A1), (A2), (A3), or (A4) had been mixed, had a high thermal conductivity in a thickness direction and/or a surface direction thereof.

INDUSTRIAL APPLICABILITY

The present invention can be used as a heat releasing material of an electronic device (e.g., a mobile phone, a personal computer, or a hybrid car).

The invention claimed is:

1. A thermoplastic resin (A) comprising, in its main chain structure, a unit (i) in an amount of 20 mol % to 55 mol %, a unit (ii) in an amount of 5 mol % to 40 mol %, a unit (iii) in an amount of 5 mol % to 40 mol %, and a unit (iv) in an amount of 5 mol % to 40 mol %, with respect to 100 mol %, which is a total molar amount of the unit (i), the unit (ii), the unit (iii), and the unit (iv), the unit (i) having a biphenyl group and being represented by the following general formula (1):

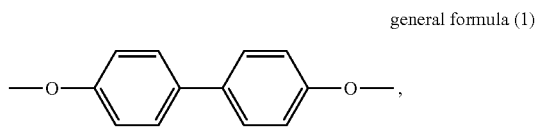

general formula (1)

the unit (ii) having a substituent biphenyl group and being represented by the following general formula (5) or the following general formula (6):

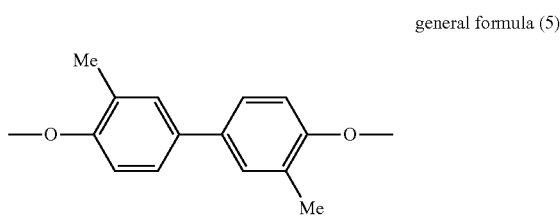

general formula (5)

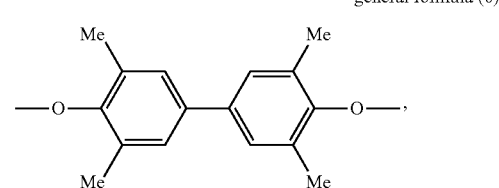

general formula (6)

the unit (iii) being represented by the following general formula (3):

—CO—R$_1$—CO—     general formula (3)

where R$_1$ represents a divalent linear substituent which has 4 to 12 atoms in its main chain and which may contain a branch, and the unit (iv) being represented by the following general formula (4):

—CO—R$_2$—CO—     general formula (4)

where R$_2$ is a divalent linear substituent which has, in its main chain, 7 to 26 atoms, different in number of atoms in the main chain of R$_1$, and which may contain a branch, and R$_2$ is larger in number of atoms in the main chain than R$_1$.

2. The thermoplastic resin (A) as set forth in claim 1, wherein a number obtained by subtracting the number of atoms in the main chain of the unit (iii) from the number of atoms in the main chain of the unit (iv) is not less than 4 and not more than 15.

3. A thermoplastic resin composition comprising:
a thermoplastic resin (A) recited in claim 1; and
an inorganic filler (B).

4. The thermoplastic resin composition as set forth in claim 3, wherein the inorganic filler (B) is at least one compound selected from the group consisting of aluminum oxide, magnesium oxide, boron nitride, aluminum nitride, silicon nitride, aluminum hydroxide, magnesium hydroxide, and diamond.

5. The thermoplastic resin composition as set forth in claim 3, wherein the inorganic filler (B) is a mixture of alumina and boron nitride.

6. The thermoplastic resin composition as set forth in claim 3, wherein the inorganic filler (B) is at least one compound selected from the group consisting of graphite, a carbon nanotube, carbon fiber, electrically conductive metal powder, electrically conductive metal fiber, soft magnetic ferrite, and zinc oxide.

7. A thermally conductive sheet comprising
a thermoplastic resin (A) recited in claim 1 or
a thermoplastic resin composition comprising:
the thermoplastic resin (A); and
an inorganic filler (B).

8. The thermally conductive sheet as set forth in claim 7, wherein the inorganic filler (B) is at least one compound selected from the group consisting of aluminum oxide, magnesium oxide, boron nitride, aluminum nitride, silicon nitride, aluminum hydroxide, magnesium hydroxide, and diamond.

9. The thermally conductive sheet as set forth in claim 7, wherein the inorganic filler (B) is a mixture of alumina and boron nitride.

10. The thermally conductive sheet as set forth in claim 7, wherein the inorganic filler (B) is at least one compound selected from the group consisting of graphite, a carbon nanotube, carbon fiber, electrically conductive metal powder, electrically conductive metal fiber, soft magnetic ferrite, and zinc oxide.

11. The thermoplastic resin (A) as set forth in claim 1, comprising, in its main chain structure:
the unit (i) in an amount of 20 mol % to 45 mol %,
the unit (ii) in an amount of 10 mol % to 25 mol %,
the unit (iii) in an amount of 10 mol % to 30 mol %, and
the unit (iv) in an amount of 10 mol % to 30 mol %,
with respect to 100 mol %, which is the total molar amount of the unit (i), the unit (ii), the unit (iii), and the unit (iv).

12. The thermoplastic resin (A) as set forth in claim 11, wherein a number obtained by subtracting the number of atoms in the main chain of the unit (iii) from the number of atoms in the main chain of the unit (iv) is not less than 4 and not more than 12.

13. The thermoplastic resin (A) as set forth in claim 12, wherein:
$R_1$ has 5 to 10 atoms in its main chain, and
$R_2$ has 12 to 15 atoms in its main chain.

14. A thermoplastic resin composition comprising:
a thermoplastic resin (A) recited in claim 13; and
an inorganic filler (B).

15. A thermoplastic resin composition comprising:
a thermoplastic resin (A) recited in claim 14; and
an inorganic filler (B).

16. A thermoplastic resin composition comprising:
a thermoplastic resin (A) recited in claim 15; and
an inorganic filler (B).

* * * * *